May 30, 1933.  A. W. WAHLGREN  1,911,860
GRANULATION OF ZINC CHLORIDE
Filed June 9, 1932
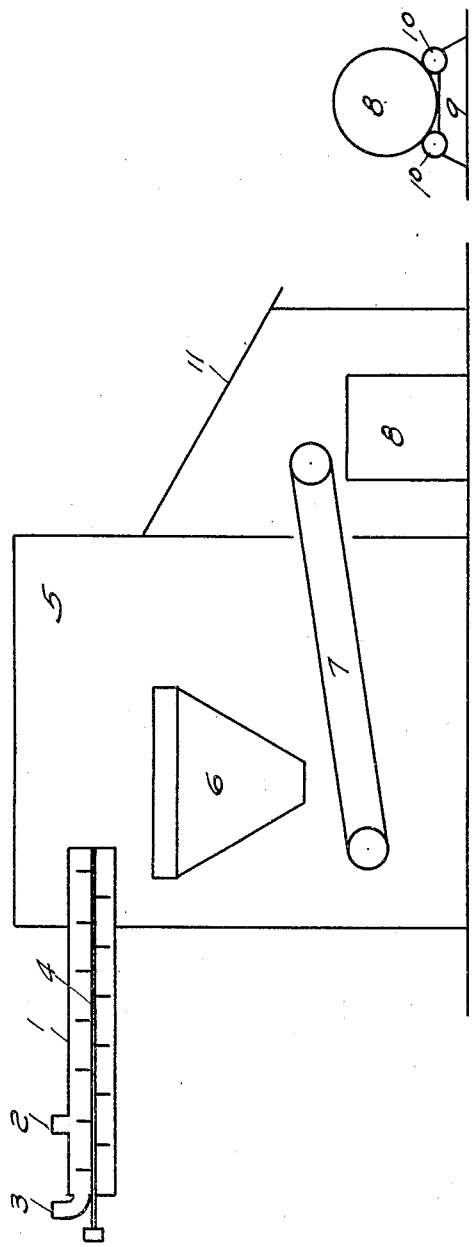
INVENTOR.
ALBERT W. WAHLGREN
BY *george lee*
ATTORNEY.

UNITED STATES PATENT OFFICE

ALBERT W. WAHLGREN, OF CALUMET CITY, ILLINOIS, ASSIGNOR TO THE GRASSELLI CHEMICAL COMPANY, OF CLEVELAND, OHIO, A CORPORATION OF DELAWARE

GRANULATION OF ZINC CHLORIDE

Application filed June 9, 1932. Serial No. 616,283.

Granular zinc chloride is commonly obtained by disruptively agitating and cooling molten zinc chloride. The so obtained product consists of granules which range in size all the way from powder to sizes which do not pass a 30 mesh screen. A mixture of granules of various sizes has a much greater tendency to cake than a product in which the granules are of reasonably uniform size; it is, therefore, necessary to screen material as ordinarily obtained.

The great hygroscopicity of zinc chloride adds serious difficulties to granulating operations and this is further complicated by the fact that granules of zinc chloride, when allowed to cool in closed containers where they would be protected from atmospheric moisture, lose more or less their individuality and agglomerate, or cake, to solid masses whereby the advantages of a granular product over solid masses obtained by solidifying fused zinc chloride directly in shiping containers is lost.

My present invention relates to means and steps of operation in preparing and packing granular zinc chloride in which the above difficulties are to a very large extent avoided.

It consists in its essential features in granulating zinc chloride in an atmosphere from which the zinc chloride is unable to attract moisture, and in agitating the granular product during cooling.

I have found that substantially anhydrous zinc chloride is in equilibrium with moist gases at temperatures above 90° C. By the term moist gases I mean gases such as for instance atmospheric air or other inert gases which are saturated with water vapor at ordinary temperature.

In the performance of my invention I effect granulation of molten zinc chloride in an atmosphere maintained above 90° C. and it is sufficient to maintain said atmosphere between 90 and 100° C. Higher temperatures up to those at which zinc chloride is decomposed are unnecessary, though not detrimental. When granulation is effected, the product is screened while maintained in contact with said heated atmosphere. The screened product is then cooled while being agitated and kept out of contact with moisture, whereby caking of the product during cooling is prevented. One convenient manner of cooling the hot product with agitation in the absence of moisture is to fill the screened zinc chloride directly, while hot, into shipping containers, immediately closing said containers and agitating the filled containers until cool.

An apparatus useful in the performance of my invention is shown schematically in the appended figure.

1 in this figure is the granulator proper and consists in stoneware tube of for instance 8–12" diameter and 10 to 15' long. This tube is equipped with an air inlet 2, a feed inlet for the molten zinc chloride 3, an agitator shaft 4, carrying pins, which is mechanically driven by any desired means, not shown, and revolving at about 110 R. P. M. The exit end of the granulator tube extends into a chamber 5 above a mechanical screening device 6 of conventional design. The screened product is removed from the screen and out of chamber 5 by a belt conveyor 7 from where it runs directly into container 8. The shipping container is protected from contact with moist and cold atmospheric air during filling by the hood 11; windows in the hood permit control of the filling operation. The additional equipment consists of a table 9 equipped with motorized trunnions 10. The filled and closed containers 8 are rolled upon these trunnions and rotated until the product is cool.

Temperature measuring devices, not shown, may be located at convenient places in the granulator tube 1 and within the chamber 5.

Hot air, as obtained from any desired source, is introduced at a temperature above 90° C. through tube 2 and leaves the apparatus through the opening in chamber 5 through which passes the belt conveyor 7. If radiation losses of chamber 5 are too large, I may install any desired heating elements therein so as to maintain the atmosphere therein above 90° C.

The molten zinc chloride introduced at 3 is obtained from any desired source and is preferably pre-cooled to about 230 to 250° C.

It will be noted that in the process as carried out in the apparatus described, the zinc chloride remains throughout the whole operation of granulation and screening at a temperature above 90° C. and in contact with an atmosphere of no lower temperature. While in the process and apparatus, as specifically described, the cooling with agitation in the absence of moisture is effected in the final shipping container, it will be understood that this cooling under the conditions specified can be carried out in different manner, or in other containers, provided moisture is kept away from the product and the zinc chloride is agitated during such cooling.

Zinc chloride, when subjected to the treatments herein described, can be obtained in the form of fine, reasonably uniform granules. The so obtained product does practically not cake, or if a slight caking takes place, the granules retain their individuality and can easily be separated by slight mechanical shaking.

Instead of the above granulating tube, I can use other granulating equipment provided the temperature of the zinc chloride and the atmosphere surrounding it is kept above 90° C.

I claim:

1. In a process of granulating zinc chloride, the steps of preventing substantial hydration of the zinc chloride during the whole series of steps of granulating, sieving and cooling, by maintaining the zinc chloride at a temperature above about 90° C. and in contact with an atmosphere heated to above 90° C. during granulation and sieving, and agitating the zinc chloride during further cooling and out of contact with moisture.

2. In a process of preventing substantial hydration of zinc chloride during granulation, the steps of running a zinc chloride melt into a vessel in which it is disruptively agitated, reducing its temperature therein to not less than 90° C. while maintaining it in contact with an atmosphere kept at a temperature above about 90° C. screening the broken up zinc chloride while hot and in contact with an atmosphere heated above 90° C. and agitating said screen product out of contact with moisture while cooling it.

3. In a process of granulating zinc chloride, the steps of maintaining the zinc chloride at a temperature above about 90° C. and in contact with an atmosphere heated to above 90° C. during the whole process of granulation and sieving until the product is stored in a closed container and agitating the product in said closed container until cooled to about room temperature.

4. In a process of granulating zinc chloride, the steps of running a zinc chloride melt into a vessel in which it is disruptively agitated, reducing its temperature therein to not less than 90° C. while maintaining it in contact with an atmosphere kept at a temperature above about 90° C. screening the broken up solid zinc chloride while still hot and in contact with said hot atmosphere, filling said hot, solid and broken up zinc chloride into containers, closing said containers and agitating the zinc chloride in said containers while cooling it.

In testimony whereof, I affix my signature.

ALBERT W. WAHLGREN.